US012562457B2

(12) United States Patent
Suh

(10) Patent No.: US 12,562,457 B2
(45) Date of Patent: Feb. 24, 2026

(54) ELECTRONIC DEVICE INCLUDING METAL ANTENNA

(71) Applicant: SAMSUNG ELECTRONICS CO., LTD., Suwon-si (KR)

(72) Inventor: Younghoon Suh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 474 days.

(21) Appl. No.: 17/994,055

(22) Filed: Nov. 25, 2022

(65) Prior Publication Data

US 2023/0163445 A1 May 25, 2023

Related U.S. Application Data

(63) Continuation of application No. PCT/KR2022/018761, filed on Nov. 24, 2022.

(30) Foreign Application Priority Data

Nov. 24, 2021 (KR) ........................ 10-2021-0163694

(51) Int. Cl.
*H01Q 1/24* (2006.01)

(52) U.S. Cl.
CPC .................................. *H01Q 1/243* (2013.01)

(58) Field of Classification Search
CPC ...................................................... H01Q 1/243
See application file for complete search history.

(56) References Cited

U.S. PATENT DOCUMENTS

| | | | | |
|---|---|---|---|---|
| 10,446,913 | B2 | 10/2019 | Jo et al. | |
| 10,484,958 | B2 | 11/2019 | Sayem et al. | |
| 11,152,686 | B2 * | 10/2021 | Shin | H05K 1/028 |
| 11,855,674 | B2 * | 12/2023 | Park | H01Q 5/307 |
| 11,962,067 | B2 * | 4/2024 | Lee | H05K 5/00 |
| 11,984,642 | B2 * | 5/2024 | Lee | H05K 1/181 |
| 2012/0176278 | A1 * | 7/2012 | Merz | H01Q 1/243 343/702 |

(Continued)

FOREIGN PATENT DOCUMENTS

| | | |
|---|---|---|
| CN | 101471520 A | 7/2009 |
| CN | 104934690 A | 9/2015 |

(Continued)

OTHER PUBLICATIONS

Communication issued Nov. 6, 2024 by the European Patent Office in European Patent Application No. 22899066.9.

(Continued)

*Primary Examiner* — Awat M Salih

(74) *Attorney, Agent, or Firm* — Sughrue Mion, PLLC

(57) ABSTRACT

An electronic device includes a housing including a front surface facing a first direction, a rear surface facing a second direction opposite to the first direction, and a side surface surrounding an inner space between the front surface and the rear surface, where at least part of the side surface includes a conductive portion, a display provided on the front surface of the housing, a printed circuit board (PCB) provided in the inner space, and a coupling member provided on the PCB and coupled to the conductive portion of the side surface, wherein the coupling member contacts the conductive portion of the side surface in the second direction.

11 Claims, 13 Drawing Sheets

(56) References Cited

U.S. PATENT DOCUMENTS

| | | | | |
|---|---|---|---|---|
| 2014/0132460 | A1 | 5/2014 | Cho et al. | |
| 2015/0319275 | A1 | 11/2015 | Lee et al. | |
| 2016/0149291 | A1 | 5/2016 | Park | |
| 2017/0094818 | A1* | 3/2017 | Kim | H04M 1/0277 |
| 2017/0237152 | A1 | 8/2017 | Lee et al. | |
| 2017/0302771 | A1 | 10/2017 | Kim et al. | |
| 2019/0067795 | A1 | 2/2019 | Shin et al. | |
| 2019/0372205 | A1 | 12/2019 | Ruaro et al. | |
| 2020/0186180 | A1 | 6/2020 | Park et al. | |
| 2021/0184337 | A1 | 6/2021 | Lee et al. | |
| 2022/0173498 | A1 | 6/2022 | Lee et al. | |

FOREIGN PATENT DOCUMENTS

| | | | |
|---|---|---|---|
| KR | 10-2014-0061085 | A | 5/2014 |
| KR | 10-1580546 | B1 | 12/2015 |
| KR | 10-2016-0061178 | A | 5/2016 |
| KR | 10-2016-0127542 | A | 11/2016 |
| KR | 10-1759950 | B1 | 7/2017 |
| KR | 10-2017-0096866 | A | 8/2017 |
| KR | 10-2017-0119392 | A | 10/2017 |
| KR | 10-2019-0021770 | A | 3/2019 |
| KR | 10-2019-0135939 | A | 12/2019 |
| KR | 10-2020-0001221 | A | 1/2020 |
| KR | 10-2091160 | B1 | 3/2020 |
| KR | 10-2020-0069167 | A | 6/2020 |
| WO | 2020/197037 | A1 | 10/2020 |

OTHER PUBLICATIONS

International Search Report (PCT/ISA/210) issued by the International Searching Authority on Feb. 28, 2023 in International Patent Application No. PCT/KR2022/018761.

Written Opinion (PCT/ISA/237) issued by the International Searching Authority on Feb. 28, 2023 in International Patent Application No. PCT/KR2022/018761.

* cited by examiner

ELECTRONIC DEVICE INCLUDING METAL ANTENNA

CROSS-REFERENCE TO RELATED APPLICATIONS

This application is a continuation of International Application No. PCT/KR2022/018761 designating the United States, filed on Nov. 24, 2022, in the Korean Intellectual Property Receiving Office and claiming priority to Korean Patent Application No. 10-2021-0163694, filed on Nov. 24, 2021, in the Korean Intellectual Property Office, the disclosures of all of which are incorporated by reference herein in their entireties.

BACKGROUND

1. Field

The disclosure relates to an electronic device including a metal antenna.

2. Description of Related Art

Along with the rapid development of electronic devices having new functions over the recent years, the electronic devices such as portable terminals become more important in people's lives. To maximize the portability and user convenience of portable terminals such as smartphones, which have become common due to the development of mobile communication technology, the demands for miniaturization and reduced weights are increasing, and components are integrated in a small space, for high performance.

Further, to provide a service of stable quality under a commercialized wireless communication network environment, an antenna device included in an electronic device should satisfy a high gain and wide beam coverage. In addition to legacy mobile communication (e.g., $2^{nd}$ generation (2G)/$3^{rd}$ generation (3G)/$4^{th}$ generation (4G)/universal mobile telecommunication system (UMTS)/long term evolution (LTE)) in low/middle/high frequency bands at or below several GHz, which supports multiple bands, Bluetooth, wireless fidelity (Wi-Fi), near field communication (NFC), global positioning system (GPS), and ultra-wideband (UWB), millimeter wave communication in a frequency band of several tens of GHz or higher (e.g., a high-band frequency at or above 28 GHz) has recently been used to accommodate the rapid increase of traffic and meet demands for increased traffic.

In order to apply the above-described various mobile communication technologies to an electronic device, various antenna modules and/or antenna radiators may be disposed in the electronic device. At least part of an electronic device housing may be formed of a conductive material (e.g., a metal), and this part (hereinafter, referred to as a "metal frame") may be used as an antenna radiator (hereinafter, referred to as a "metal antenna"). To achieve antenna performance of the electronic device using the metal frame as an antenna, various factors such as interference between antennas disposed in the electronic device, and integration and appropriate distribution between supported bands may need to be considered.

The electronic device may include at least one coupling member which is disposed in the inner space of a housing to feed power to or ground the metal frame, and configured to connect the metal frame and a printed circuit board (PCB) on which at least one component (e.g., a communication module) is disposed. As an example of the coupling member, a C-clip may be applied, which may be disposed between one surface of the PCB and the metal frame, with a specified pressed amount, and may electrically connect the component of the PCB and the metal frame to each other. In addition, when the C-clip is used to connect the metal frame to the PCB, a flange that protrudes and extends from the metal frame toward the inner space of the housing may be provided.

However, when the flange overlaps with an electronic component such as a display of the electronic device, the performance of the antenna using the metal frame may be degraded. For example, the flange extending from the metal frame may overlap with an edge of the display adjacent to the bezel of the electronic device in a height direction of the electronic device. In view of the recent trend toward reduction of the bezel of an electronic device to increase the display area of the electronic device, the flange and the edge of the display may overlap over a wider area, thereby causing the degradation of the antenna performance.

SUMMARY

Provided are an electronic device, system, and method that may prevent the degradation of antenna performance, when feeding or grounding is performed for a metal frame by a coupling member.

Additional aspects will be set forth in part in the description which follows and, in part, will be apparent from the description, or may be learned by practice of the presented embodiments.

According to an aspect of the disclosure, an electronic device may include a housing including a front surface facing a first direction, a rear surface facing a second direction opposite to the first direction, and a side surface surrounding an inner space between the front surface and the rear surface, wherein at least part of the side surface includes a conductive portion, a display provided on the front surface of the housing, a printed circuit board (PCB) provided in the inner space, and a coupling member provided on the PCB and coupled to the conductive portion of the side surface, wherein the coupling member contacts the conductive portion of the side surface in the second direction.

According to an aspect of the disclosure, an electronic device may include a housing including a front surface facing a first direction, a rear surface facing a second direction opposite to the first direction, and a side surface surrounding an inner space between the front surface and the rear surface, where at least part of the side surface includes a conductive portion, a display provided on the front surface, a first PCB provided in the inner space, a second PCB provided inside the housing and spaced apart from the first PCB by a predetermined distance in the second direction, and a coupling member provided on one surface of the second PCB, and coupled to the conductive portion of the side surface, where the conductive portion of the side surface includes a first inner side surface exposed in a third direction different from the first direction and the second direction in the inner space and a second inner side surface exposed in the second direction, and the coupling member contacts the second inner side surface of the conductive portion of the side surface.

According to an aspect of the disclosure, an electronic device may include a housing including a front surface facing a first direction, a rear surface facing a second direction opposite to the first direction, an inner space between the front surface and the rear surface, and a side surface comprising a conductive portion, a first PCB provided in the inner space, a second PCB spaced apart from the first PCB in the second direction, and a coupling member coupled to the conductive portion of the side surface. The conductive portion of the side surface may include a first inner side surface exposed in the inner space in a third direction different from the first direction and the second direction and a second inner side surface exposed in the second direction, and the coupling member may contact the second inner side surface of the conductive portion of the side surface.

According to various embodiments of the disclosure, a metal frame may not be provided with a flange protruding into the inner space of a housing, for power feeding or grounding. The resulting minimization of overlap between the flange and an electronic component in a height direction (second direction) of an electronic device may prevent or reduce the degradation of antenna performance.

According to various embodiments of the disclosure, since the metal frame and a coupling member are assembled in the height direction (second direction) of the electronic device, the assembly may be easy, and the shortcomings of the related art side contact method for the metal frame (e.g., the coupling member is assembled by sliding to prevent damage to an electronic component in the side contact method) may be overcome.

According to various embodiments of the disclosure, a stable contact structure may be achieved by supporting one side of the coupling member (e.g., the opposite side of a contact point contacting the metal frame) by a support member.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
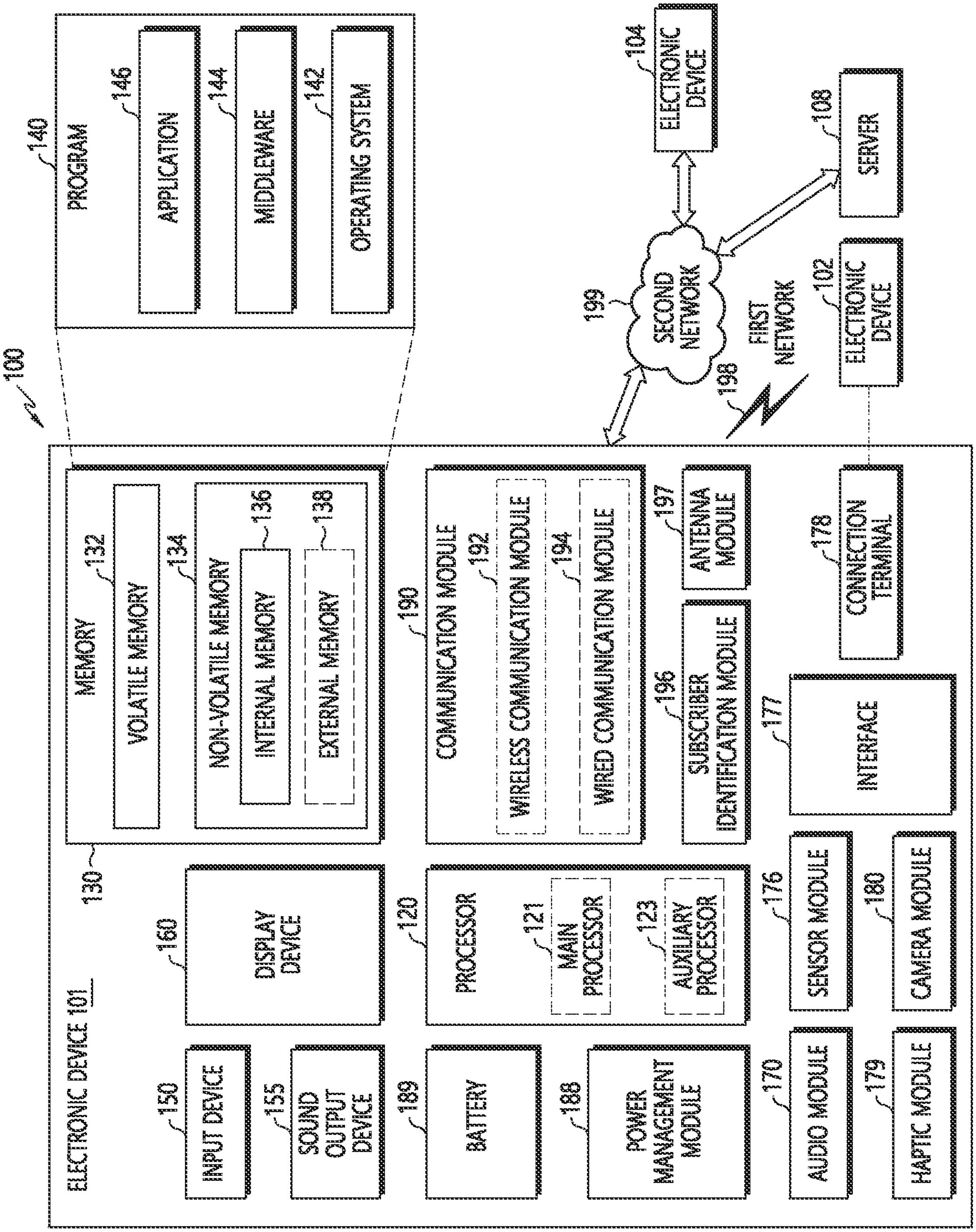
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
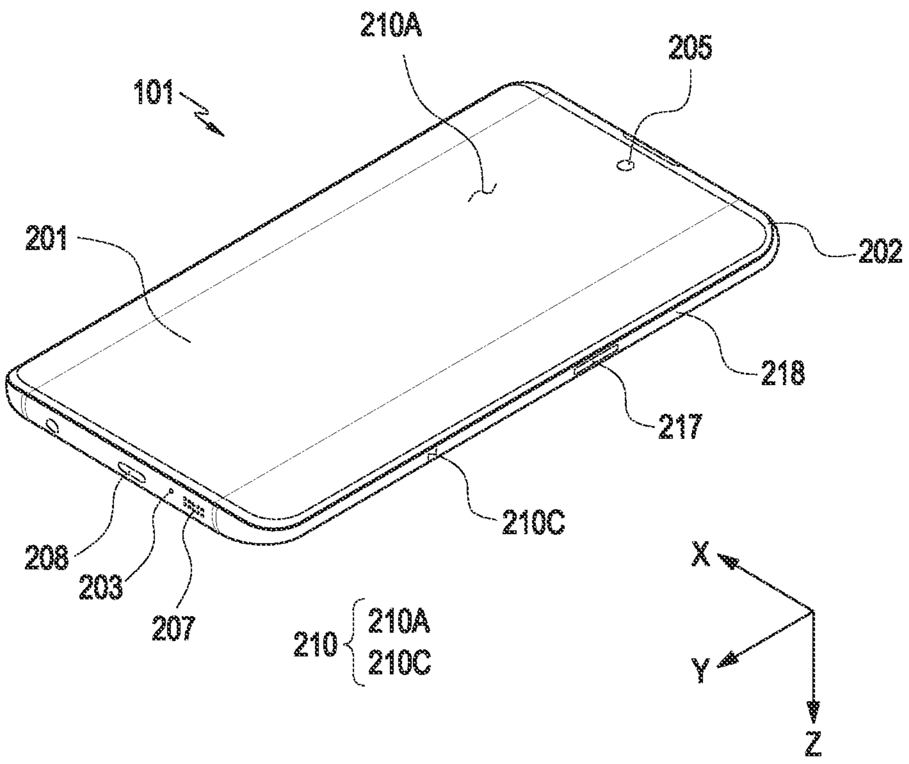
FIG. 2A is a diagram illustrating an electronic device according to various embodiments of the disclosure.
Figure 2B:
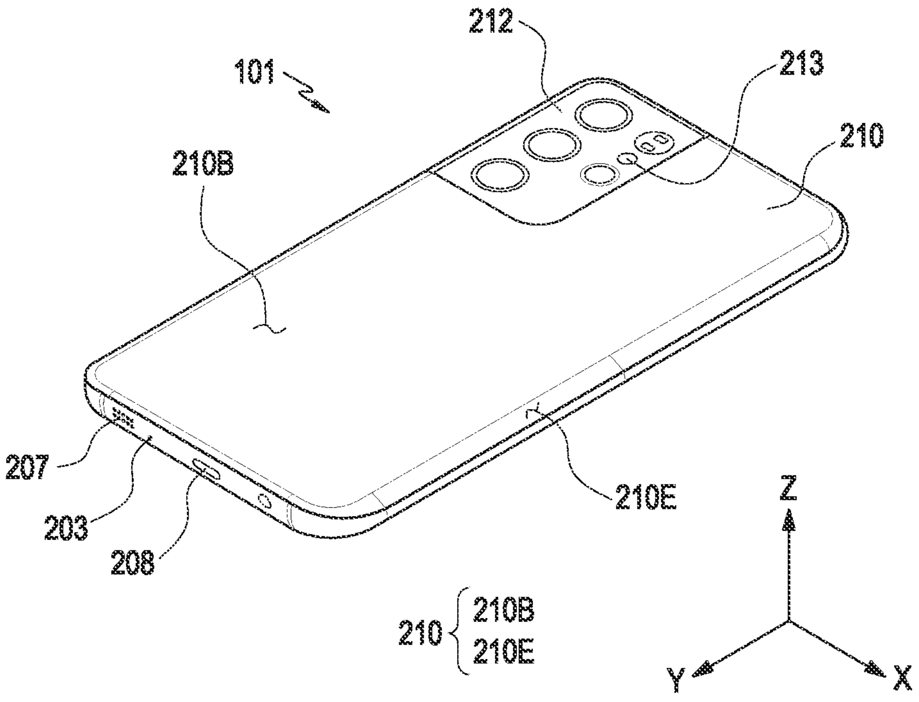
FIG. 2B is a diagram illustrating an electronic device according to various embodiments of the disclosure.

FIG. 2A is a diagram illustrating an electronic device according to various embodiments of the disclosure. FIG. 2B is a diagram illustrating the electronic device according to various embodiments of the disclosure.

In FIGS. 2A and 2B and the following drawings, a spatial coordinate system including an X axis, a Y axis perpendicular to the X axis, and a Z axis perpendicular to the X axis and the Y axis may be illustrated. According to various embodiments, the X axis of the spatial coordinate system may correspond to a width direction of the electronic device 101, the Y axis of the spatial coordinate system may correspond to a length direction of the electronic device 101, and the Z axis of the spatial coordinate system may correspond to a height direction of the electronic device 101. In the description of various embodiments, Z axis of the spatial coordinate system may correspond to the "height direction (or second direction)" mentioned below.

Referring to FIGS. 2A and 2B, the electronic device 101 according to an embodiment may include a housing 210 which includes a front surface 210A, a rear surface 210B, and side surfaces 210C surrounding a space between the front surface 210A and the rear surface 210B. In another embodiment, the housing 210 may refer to a structure that forms part of the front surface 210A of FIG. 2A, the rear surface 210B of FIG. 2B, and the side surfaces 210C. According to an embodiment, at least part of the front surface 210A may be formed by a front plate 202 (e.g., a glass plate or polymer plate including various coating layers) which is at least partially substantially transparent. The rear surface 210B may be formed by a rear plate 211. The rear plate 211 may be formed of, for example, glass, ceramic, a polymer, a metal (e.g., aluminum, stainless steel (STS), or magnesium), or a combination of at least two of these materials. The side surfaces 210C may be coupled with the front plate 202 and the rear plate 211 and formed by a side bezel structure (or "side member") 218 including a metal and/or a polymer. In an embodiment, the rear plate 211 and the side bezel structure 218 may be integrally formed and include the same material (e.g., glass, a metal material such as aluminum, or ceramic).

In the illustrated embodiment, the front plate 202 may include two first edge regions 210D bent and extending seamlessly from the front surface 210A toward the rear plate 211, at both ends of long edges of the front plate 202. In the illustrated embodiment (refer to FIG. 2B), the rear plate 211 may include two second edge regions 210E bent and extending seamlessly from the rear surface 210B toward the front plate 202 at both ends of long edges of the rear plate 211. In an embodiment, the front plate 202 (or the rear plate 211) may include only one of the first edge regions 210D (or the second edge regions 210E). In another embodiment, some of the first edge regions 210D or the second edge regions 210E may not be included. In the above embodiments, when viewed from a side of the electronic device 101, the side bezel structure 218 may have a first thickness (or width) on side surfaces without the first edge regions 210D or the second edge regions 210E, and a second thickness smaller than the first thickness on side surfaces with the first edge regions 210D or the second edge regions 210E.

According to an embodiment, the electronic device 101 may include at least one of a display 201, audio modules 203, 207, and 214 (e.g., the audio module 170 of FIG. 1), a sensor module (e.g., the sensor module 176 of FIG. 1), camera modules 205 and 212 (e.g., the camera module 180 of FIG. 1), key input devices 217 (e.g., the input module 150 of FIG. 1), or connector holes 208 and 209 (e.g., the connecting terminal 178 of FIG. 1). In an embodiment, the electronic device 101 may not be provided with at least one (e.g., the connector hole 209) of the components or additionally include other components.

According to an embodiment, the display 201 may be visually exposed, for example, through a substantial portion of the front plate 202. In an embodiment, at least part of the display 201 may be exposed through the front plate 202 forming the front surface 210A and the first edge regions 210D. In an embodiment, the corners of the display 201 may be formed in the same shapes as those of adjacent peripheral portions of the front plate 202 on the whole. In another embodiment, the gap between the periphery of the display 201 and the periphery of the front plate 202 may be equal on the whole to increase the exposed area of the display 201.

According to an embodiment, a surface (or the front plate 202) of the housing 210 may include a view area formed by visual exposure of the display 201. For example, the view area may include the front surface 210A and the first edge regions 210D.

In another embodiment, a recess or an opening may be formed in part of the view area (e.g., the front surface 210A and the first edge regions 210D) of the display 201, and include at least one of the audio module 214, a sensor module, a light emitting element, or the camera module 205, which is aligned with the recess or the opening. In another embodiment, at least one of the audio module 214, a sensor module, the camera module 205, a fingerprint sensor, or a light emitting element may be included on the rear surface of the view area of the display 201.

In another embodiment, the display 201 may be incorporated with or disposed adjacent to a touch sensing circuit, a pressure sensor that measures the intensity (pressure) of a touch, and/or a digitizer that detects a magnetic field-based stylus pen.

In an embodiment, at least some of the key input devices 217 may be disposed in the first edge regions 210D and/or the second edge regions 210E.

According to an embodiment, the audio modules 203, 207, and 214 may include a microphone hole 203 and speaker holes 207 and 214. A microphone for obtaining an external sound may be disposed in the microphone hole 203, and in an embodiment, a plurality of microphones may be disposed to detect the direction of a sound. The speaker holes 207 and 214 may include an external speaker hole 207 and a receiver hole 214 for calls. In an embodiment, the speaker holes 207 and 214 and the microphone hole 203 may be implemented as a single hole, or a speaker (e.g., a piezo speaker) may be included without the speaker holes 207 and 214. The audio modules 203, 207, and 214 may be designed in various manners such as installation of only some audio modules or addition of a new audio module according to the structure of the electronic device 101, not limited to the above structure.

According to an embodiment, a sensor module may generate, for example, an electrical signal or data value corresponding to an internal operation state or external environmental state of the electronic device 101. The sensor module may include, for example, a first sensor module (e.g., a proximity sensor) and/or a second sensor module (e.g., a fingerprint sensor), which is disposed on the front surface 210A of the housing 210, and/or a third sensor module (e.g., a heart rate monitor (HRM) sensor) and/or a fourth sensor module (e.g., a fingerprint sensor), which is disposed on the rear surface 210B of the housing 210. In an embodiment, the fingerprint sensor may be disposed on the rear surface 210B as well as on the front surface 210A (e.g., the display 201) of the housing 210. The electronic device 101 may further include a sensor module, for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, or an illuminance sensor. The sensor module may be designed in various manners such as installation of only some sensor modules or addition of a new sensor module according to the structure of the electronic device 101, not limited to the above structure.

According to an embodiment, the camera modules 205 and 212 may include, for example, a front camera module 205 disposed on the front surface 210A of the electronic device 101, and a rear camera module 212 and/or a flash 213 disposed on the rear surface 210B of the electronic device 101. Each of the camera modules 205 and 212 may include one or more lenses, an image sensor, and/or an image signal processor. The flash 213 may include, for example, a light emitting diode (LED) or a xenon lamp. In an embodiment, two or more lenses (an IR camera, a wide-angle lens, and a telephoto lens) and image sensors may be arranged on one surface of the electronic device 101. The camera modules 205 and 212 may be designed in various manners such as installation of only some camera modules or addition of a new camera module according to the structure of the electronic device 101, not limited to the above structure.

According to an embodiment, the electronic device 101 may include a plurality of camera modules (e.g., a dual camera or a triple camera) each having a different attribute (e.g., angle of view) or function. For example, a plurality of camera modules 205 and 212 including lenses having different angles of view may be configured, and the electronic device 101 may control changing of the angles of view of the camera modules 205 and 212 implemented in the electronic device 101 based on a user selection. For example, at least one of the plurality of camera modules 205 and 212 may be a wide-angle camera, and at least one other camera module may be a telephoto camera. Similarly, at least one of the plurality of camera modules 205 and 212 may be a front camera, and at least one other camera module may be a rear camera. Further, the plurality of camera modules 205 and 212 may include at least one of a wide-angle camera, a telephoto camera, or an IR camera (e.g., a time of flight (TOF) camera or a structured light camera). According to an embodiment, the IR camera may be operated as at least part of the sensor module. For example, the TOF camera may be operated as at least part of a sensor module for detecting a distance to a subject.

According to an embodiment, the key input devices 217 may be arranged on side surfaces 210C of the housing 210. In another embodiment, the electronic device 101 may not include some or any of the above key input devices 217, and the key input devices 217 which are not included may be implemented in other forms such as soft keys on the display 201. In an embodiment, the key input devices may include a sensor module disposed on the rear surface 210B of the housing 210.

According to an embodiment, a light emitting element may be disposed, for example, on the front surface 210A of the housing 210. The light emitting element may provide, for example, state information about the electronic device 101 in the form of light. In another embodiment, the light emitting element may provide a light source interworking, for example, with an operation of the front camera module 205. The light emitting element may include, for example, an LED, an IR LED, and/or a xenon lamp.

According to an embodiment, the connector holes 208 and 209 may include a first connector hole 208 that may accommodate a connector (e.g., a universal serial bus (USB) connector) for transmitting and receiving power and/or data to and from an external electronic device, and/or a second connector hole 209 (e.g., an earphone jack) that may accommodate a connector for transmitting and receiving an audio signal to and from an external electronic device. The connector holes 208 and 209 may be designed in various manners such as installation of only some connector hole or addition of a new connector hole according to the structure of the electronic device 101, not limited to the above structure.

According to an embodiment, the camera module 205 and/or a sensor module may be disposed in the internal space of the electronic device 101 to communicate with the external environment through a specified area of the display 201 and the front plate 202. For example, the specified area may be an area in which pixels are not disposed on the display 201. In another embodiment, the specified area may be an area in which pixels are disposed on the display 201. When viewed from above the display 201, at least a part of the specified area may overlap with the camera module 205 and/or the sensor module. In another example, some sensor module may be disposed in the internal space of the electronic device to perform its function without being visually exposed through the front plate 202.

The electronic device 101 illustrated in FIGS. 2A and 2B has a bar-type or plate-type outward appearance, which should not be construed as limiting the disclosure. For example, the illustrated electronic device may be part of a rollable electronic device or foldable electronic device. A "rollable electronic device" may refer to an electronic device in which a display is bendable to be deformed and thus partially wound or rolled or accommodated in a housing (e.g., the housing 210 of FIG. 2A). According to a user need, the rollable electronic device may increase a view area by unfolding the display or exposing a larger area of the display to the outside. A "foldable electronic device" may refer to an electronic device in which a display is foldable such that two different areas of the display face each other or in opposite directions. In general, the display may be folded with two different areas facing each other or in opposite directions in a portable state, whereas the user may unfold the display with the two different areas of the display being substantially flat in an actual use state, in the foldable electronic device. In an embodiment, the electronic device 101 according to various embodiments of the disclosure may be interpreted as including not only a portable electronic device such as a smartphone, but also various other electronic devices such as a laptop computer or a home appliance.

According to various embodiments of the disclosure, various embodiments for preventing the degradation of antenna performance during feeding or grounding of a metal frame through a coupling member are provided. For example, in the case of a structure in which a flange is formed on a metal frame and coupled to a PCB to use the metal frame as an antenna, the disclosure is intended to solve the problem of degraded antenna performance caused by overlap between the flange and an electronic component. The structures of a metal frame and a coupling member according to related art (referred to as a first comparative example) will be described with reference to FIGS. 3, 4 and 5.

Figure 3:
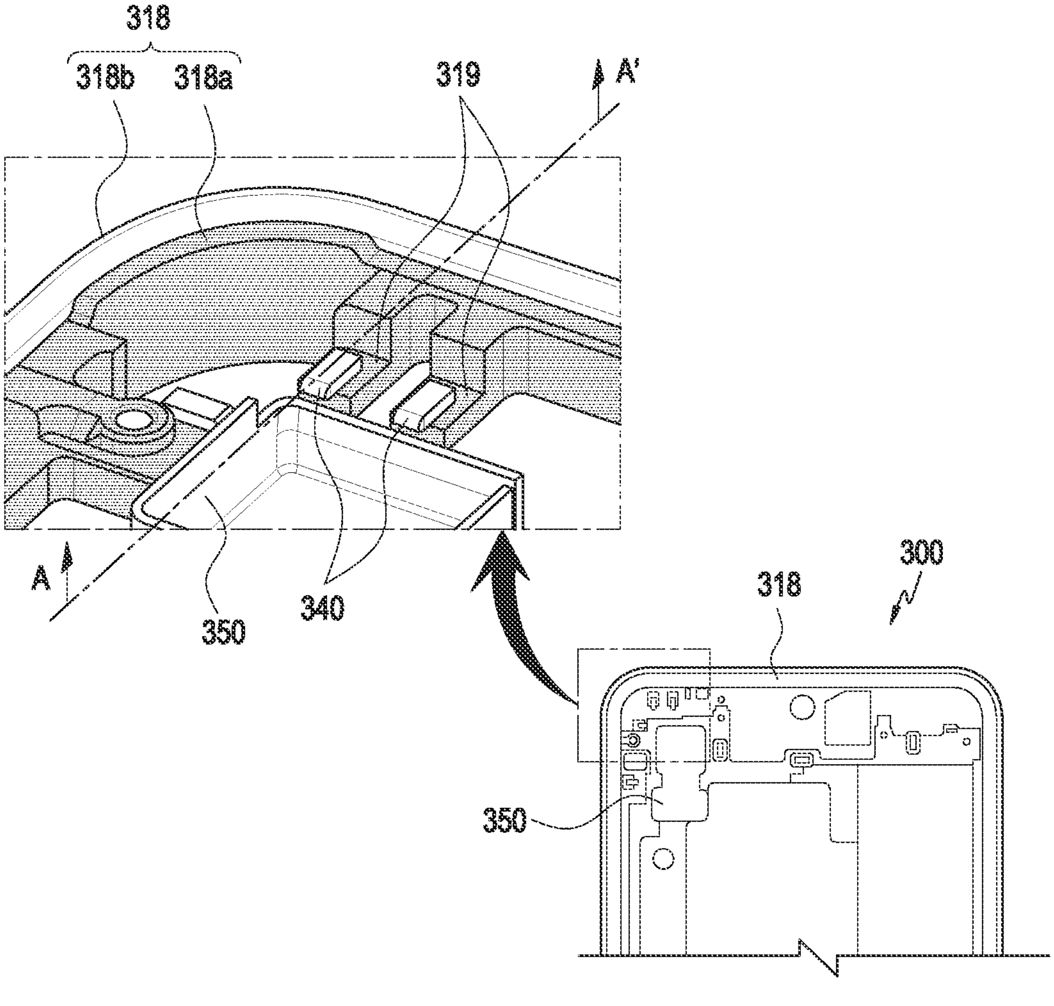
FIG. 3 (RELATED ART)
FIG. 3 is a diagram illustrating an inner side surface of an electronic device according to a first comparative example.
Figure 4:
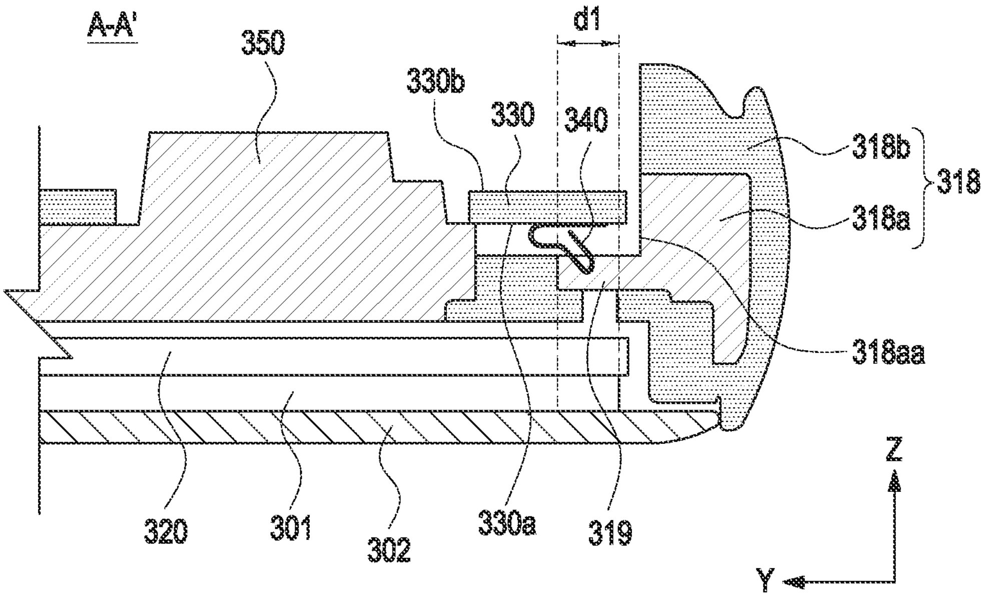
FIG. 4 (RELATED ART)
FIG. 4 is a diagram illustrating a cross-section of a side surface of an electronic device according to the first comparative example.
Figure 5:
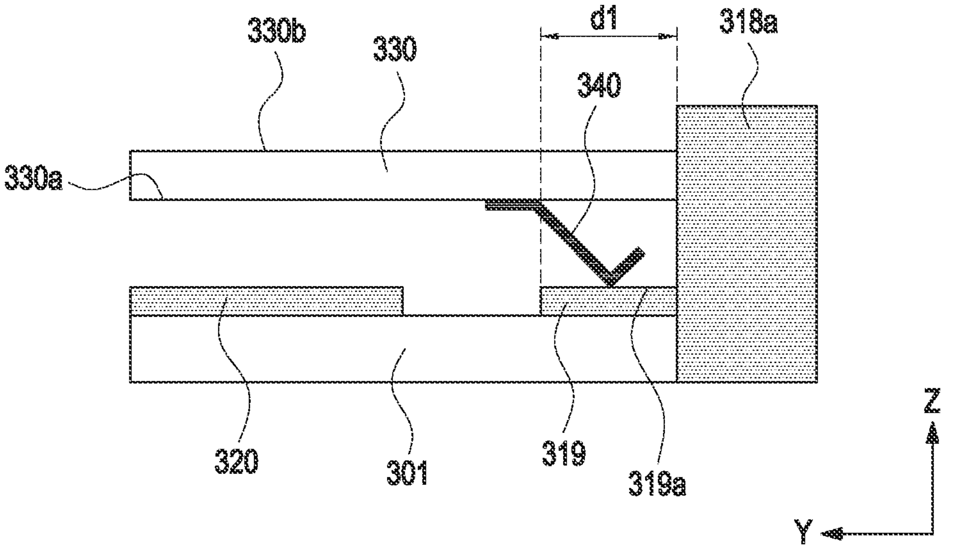
FIG. 5 (RELATED ART)
FIG. 5 is a diagram illustrating a cross-section of a side surface of an electronic device according to the first comparative example.

FIG. 3 is a diagram illustrating an inner side surface of the electronic device 300 according to the first comparative example. FIG. 4 is a diagram illustrating a cross-section of a side surface of the electronic device 300 according to the first comparative example. FIG. 5 is a diagram illustrating the cross-section of the side surface of the electronic device 300 according to the first comparative example. The cross-section illustrated in FIG. 4 may be a cross-section of the electronic device 300 illustrated in FIG. 3, taken along an A-A' direction.

Referring to FIGS. 3, 4 and 5, the electronic device 300 according to the first comparative example may include a display 301 (e.g., the display 201 of FIGS. 2A and 2B), a front plate 302 (e.g., the front plate 202 of FIGS. 2A and 2B), a side bezel structure 318 (e.g., the side bezel structure 218 of FIGS. 2A and 2B) (hereinafter, referred to as a "side surface" 318) surrounding an inner space of a housing, PCBs 320 and 330, and a coupling member 340. The electronic device 300 may not be provided with at least one of the components or may additionally include other components. For example, the electronic device 300 may further include a rear plate (e.g., the rear plate 211 of FIG. 2B) and/or a support member 350 (e.g., a bracket) (e.g., the rear plate 211 of FIG. 2B), which is disposed in the inner space of the housing and coupled to the side bezel structure 318 or which is formed integrally with the side bezel structure 318.

The PCBs 320 and 330 may have various electronic components, for example, a processor (e.g., the processor 120 of FIG. 1), memory (e.g., the memory 130 of FIG. 1), and/or an interface (e.g., the interface 177 of FIG. 1) mounted thereon. Further, a communication module (e.g., the communication module 190 of FIG. 1) and/or an antenna module (e.g., the antenna module 197 of FIG. 1) may be mounted on the PCBs 320 and 330. The PCBs 320 and 330 may include a first PCB 320 disposed in a portion of the inner space of the housing, and a second PCB 330 disposed at a different position from the first PCB 320. The first PCB 320 may be a flexible PCB (FPCB) disposed on the rear surface of the display 301, and the second PCB 330 may be made of a rigid material. The second PCB 330 may be a sub-PCB, which may be spaced apart from a main PCB (e.g., the first PCB 320 or a third PCB) in the electronic device 300. While two PCBs are shown as the PCBs 320 and 330 in FIGS. 4 and 5, the disclosure is not limited thereto, and one PCB or three or more PCBs may be provided. In addition, the above-described PCB(s) (the first PCB 320 and the second PCB 330) in the disclosure are not limited to any specific embodiment in terms of arrangement and use.

The communication module (e.g., the communication module 190 of FIG. 1) and/or the antenna module (e.g., the antenna module 197 of FIG. 1) may be disposed on the PCBs 320 and 330. When the communication module and/or the antenna module are disposed on the PCBs 320 and 330, a direct (e.g., wired) communication channel or a radio communication channel may be established, communication through the established communication channel may be supported, and signals may be exchanged between the electronic device 300 and an external electronic device (e.g., the electronic devices 102 and 104 or the server 108 of FIG. 1) by using the communication module and/or the antenna module.

Part of the housing, for example, at least part of the side bezel structure 318 may be formed of a conductive portion 318*a* (e.g., a metal). Use of the conductive portion 318*a* of the side bezel structure 318 as an antenna radiator may enable various types of communications such as 2$^{nd}$ generation (2G)/3$^{rd}$ generation (3G)/4$^{th}$ generation (4G) communication, Bluetooth, wireless fidelity (Wi-Fi), and/or ultra-wideband (UWB) as well as short-range communication such as near field communication (NFC), magnetic secure transmission (MST), and wireless charging.

To use the conductive portion 318*a* of the side bezel structure 318 as an antenna, the side bezel structure 318 requires feeding and/or grounding, and the coupling member 340 may be used for the feeding and/or grounding. For example, the coupling member 340 may be disposed on the second PCB 330, and electronic components disposed on the second PCB may be electrically coupled to the side bezel structure 318 through the coupling member 340.

In the first comparative example illustrated in FIGS. 3, 4 and 5, when the coupling member 340 is coupled to the side bezel structure 318, a flange 319 may be formed to protrude and extend from the side bezel structure 318 into the inner space of the housing, as a component to increase contact stability in the electronic device 300. For example, the side bezel structure 318 according to first comparative example may include the conductive portion 318*a* (e.g., a metal frame) and a non-conductive portion 318*b* (e.g., an injection-molded portion) at least partially surrounding the conductive portion 318*a*. The side bezel structure 318 may further include the flange 319 protruding and extending from the conductive portion 318*a* into the inner space of the housing. The flange 319 may be provided for stable contact between the coupling member 340 and the conductive portion 318*a*. As the flange 319 protrudes and extends into the inner space of the housing, the flange 319 may overlap with an electronic component of the electronic device. The second PCB 330 may include a first surface 330*a* facing a first direction (e.g., a direction opposite to the Z axis) and a second surface 330*b* facing a second direction (e.g., a direction parallel to the Z axis). A portion overlapping with the coupling member 340 may be omitted in the second PCB 330. Referring to FIGS. 4 and 5, it is illustrated that the coupling member 340 is disposed on the first surface (e.g., 330*a*) of the second PCB 330, and the flange 319 overlaps with the display 301 of the electronic device by as much as a first distance d1. In the first comparative example, when the flange 319 overlaps with an electronic component such as the display 301 in this way, the performance of an antenna using a metal frame may be degraded according to transmission/reception characteristics of radio waves.

Now, a description will be given of the structures of a metal frame and a coupling member according to related art (referred to as a second comparative example) with reference to FIGS. 6, 7 and 8.

Figure 6:
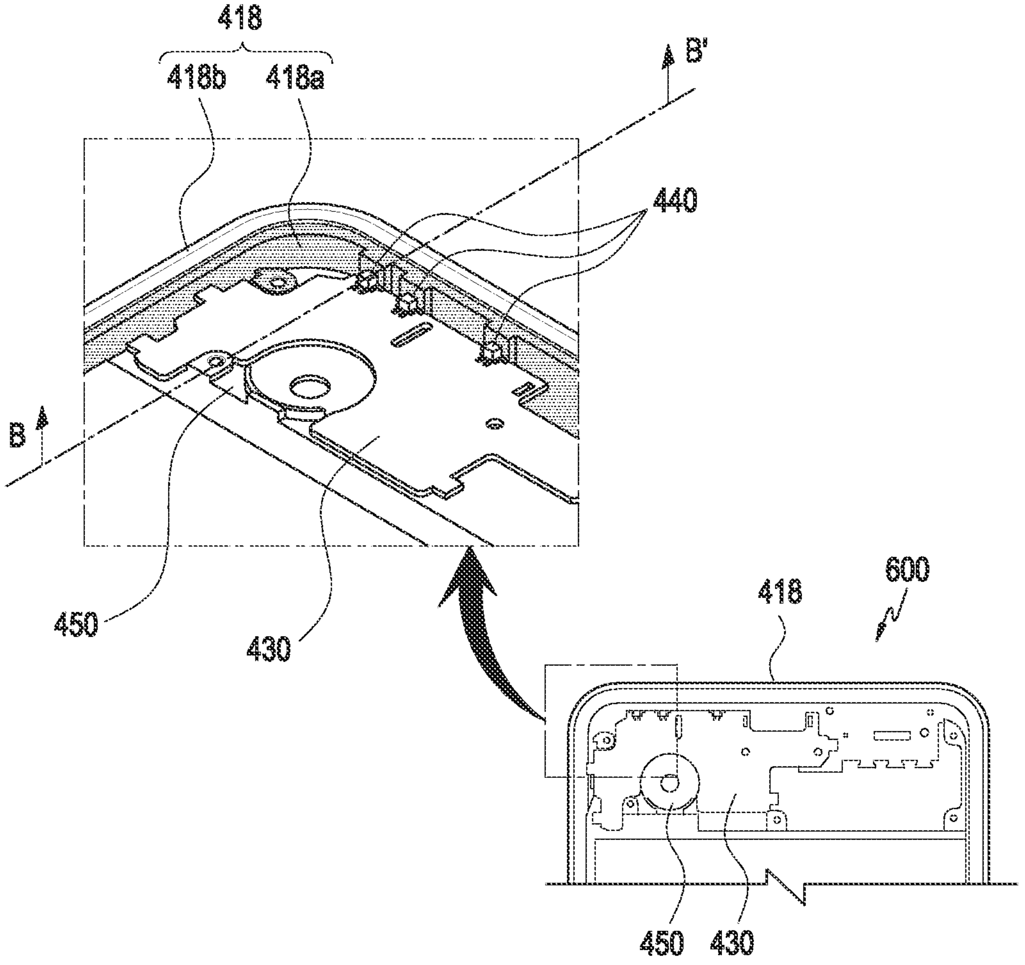
FIG. 6 (RELATED ART)
FIG. 6 is a diagram illustrating an inner side surface of an electronic device according to a second comparative example.

FIG. 6 is a diagram illustrating an inner side surface of the electronic device 600 according to the second comparative example. FIG. 7 is a diagram illustrating a cross-section of a side surface of the electronic device 600 according to the second comparative embodiment. FIG. 8 is a diagram illustrating the cross-section of the side surface of the electronic device 600 according to the second comparative embodiment. The cross-section illustrated in FIG. 7 may be a cross-section of the electronic device 600 illustrated FIG. 6, taken along a B-B' direction.

Figure 7:
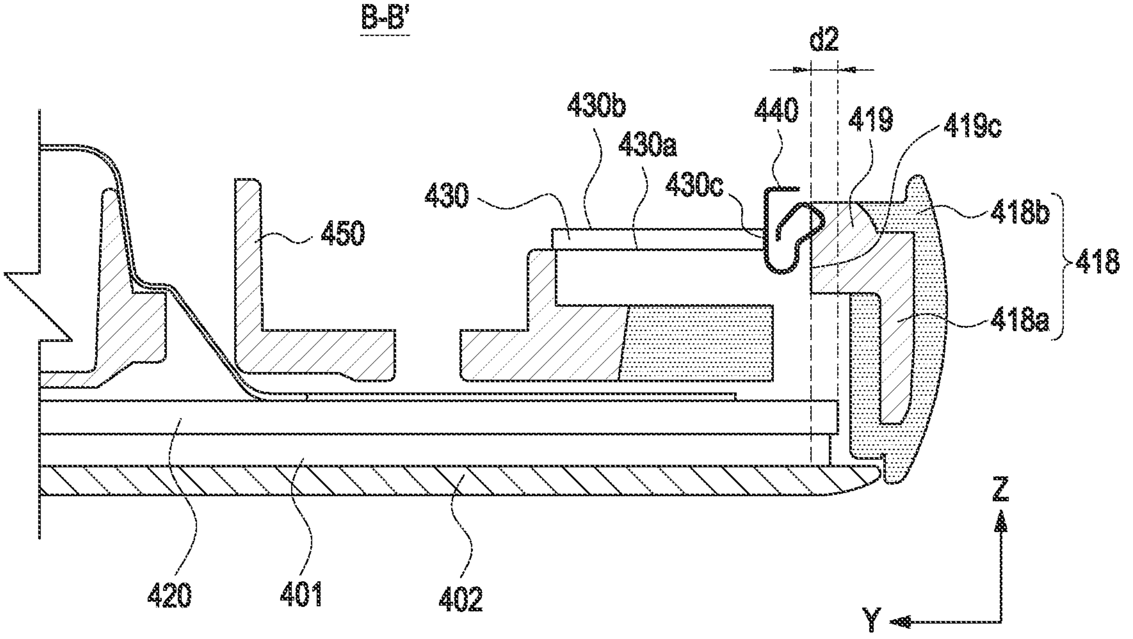
FIG. 7 (RELATED ART)
FIG. 7 is a diagram illustrating a cross-section of a side surface of an electronic device according to a second comparative example.
Figure 8:
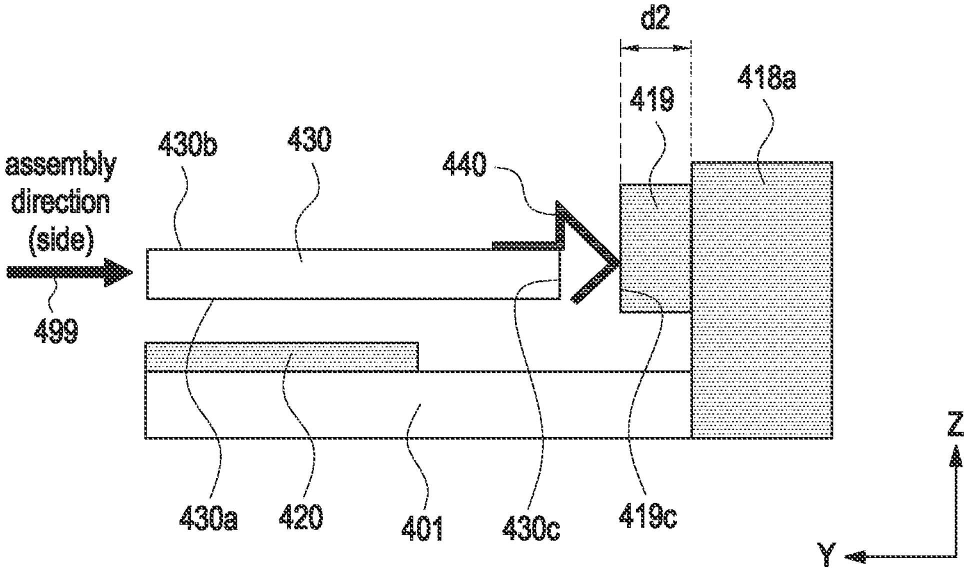
FIG. 8 (RELATED ART)
FIG. 8 is a diagram illustrating a cross-section of a side surface of an electronic device according to the second comparative example.

Referring to FIGS. 6, 7 and 8, the electronic device 600 according to the second comparative example may include a display 401 (e.g., the display 201 of FIGS. 2A and 2B), a front plate 402 (e.g., the front plate 202 of FIGS. 2 and 2B), a side bezel structure 418 (e.g., the side bezel structure 218 of FIGS. 2A and 2B) (referred to as a "side surface" 418) surrounding the inner space of a housing, PCBs 420 and 430, and a coupling member 440. The electronic device 600 may further include a rear plate (e.g., the rear plate 211 of FIG.

2B) and/or a support member 450 (e.g., a bracket), which is disposed in the inner space of the housing and coupled to the side bezel structure 418 or which is formed integrally with the side bezel structure 418.

In describing FIGS. 6, 7 and 8, a redundant description to that of FIGS. 3, 4 and 5 will be avoided.

As in the first comparative example described before with reference to FIGS. 3, 4 and 5, the side bezel structure 418 also requires feeding and/or grounding to use a conductive portion 418*a* of the side bezel structure 418 as an antenna, and the coupling member 440 may be used for the feeding and/or grounding in the second comparative example illustrated in FIGS. 6, 7 and 8. For example, the coupling member 440 may be disposed on the second PCB 430, and electronic components disposed on the second PCB 430 may be electrically coupled to the side bezel structure 418 through the coupling member 440.

According to the second comparative example illustrated in FIGS. 6, 7 and 8, when the coupling member 440 is coupled to the side bezel structure 418, a flange 419 may be formed to protrude and extend from the side bezel structure 418 into the inner space of the housing, as a component to increase contact stability in the electronic device 600. For example, the side bezel structure 418 according to the second comparative example may include the conductive portion 418*a* (e.g., a metal frame) and a non-conductive portion 418*b* (e.g., an injection-molded portion) at least partially surrounding the conductive portion 418*a*. The side bezel structure 418 may further include the flange 419 protruding and extending from the conductive portion 418*a* into the inner space of the housing. As the flange 419 protrudes and extends into the inner space of the housing, the flange 419 may overlap with an electronic component of the electronic device 600. Referring to FIGS. 7 and 8, it is illustrated that the coupling member 440 is disposed on a second surface (e.g., 430*b* of FIG. 8) or a third surface (e.g., 430*c* of FIG. 7) of the second PCB 430, and the flange 419 overlaps with the display 401 of the electronic device 600 by as much as a second distance d2. When the flange 419 overlaps with an electronic component such as the display 401 in this way, the performance of an antenna using a metal frame may be degraded according to transmission/reception characteristics of radio waves. Compared to the first comparative example described with reference to FIGS. 3, 4 and 5, the flange 419 may be formed to overlap with the display 401 of the electronic device 600 by as much as a smaller distance in the second comparative example illustrated in FIGS. 6, 7 and 8. Accordingly, the second comparative example illustrated in FIGS. 6, 7 and 8 may be advantageous over the first comparative example illustrated in FIGS. 3, 4 and 5 in terms of antenna performance.

However, unlike the first comparative example described with reference to FIGS. 3, 4 and 5, the coupling member 440 may be assembled to the conductive portion 418*a* in a side contact method in the second comparative example illustrated in FIGS. 6, 7 and 8. Referring to FIG. 8, an arrow 499 indicates an assembly direction of the coupling member 440 during assembly of the electronic device. In the case of side contact-based assembly, the coupling member 440 may be assembled in a lateral direction (e.g., in the Y-axis direction) rather than in the height direction (e.g., the Z-axis direction) of the electronic device, to prevent damage caused by interference between components, as illustrated in FIG. 8. In this case, assembly difficulty may be higher than in the first comparative example described with reference to FIGS. 3, 4 and 5, thereby increasing a manufacturing time and cost.

As a method of solving the problems discussed in the foregoing first and second comparative examples, the structures of a metal frame and a coupling member according to various embodiments of the disclosure will be described with reference to FIGS. 9, 10 and 11.

Figure 9:
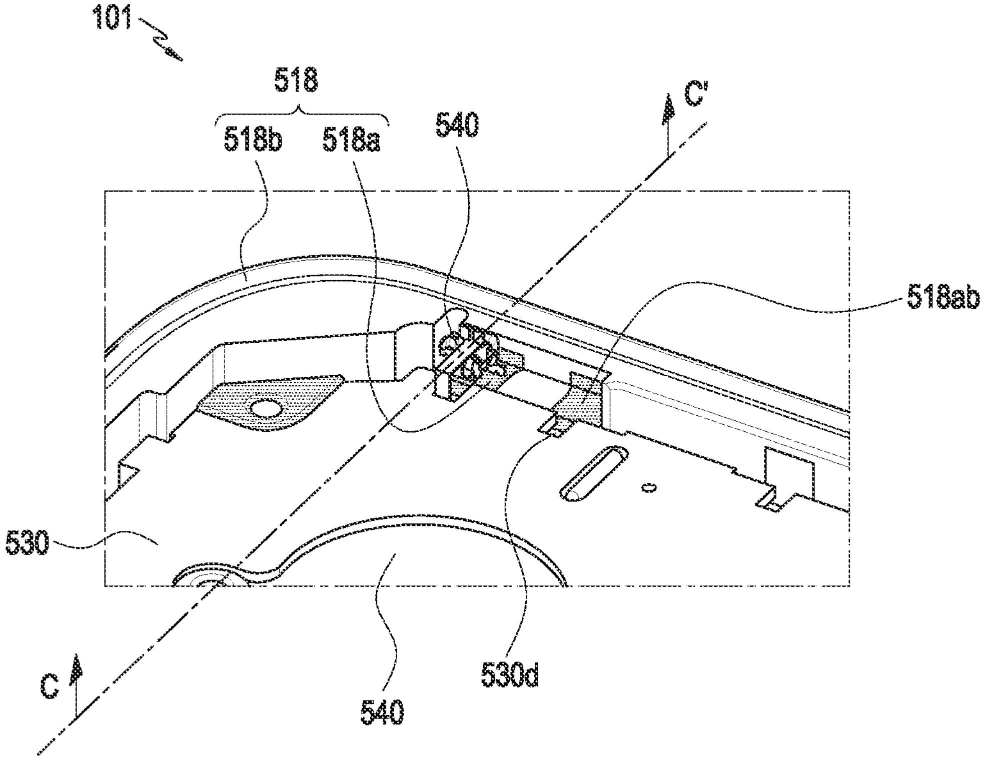
FIG. 9 is a diagram illustrating an inner side surface of an electronic device according to various embodiments of the disclosure.

FIG. 9 is a diagram illustrating an inner side surface of the electronic device 101 according to various embodiments of the disclosure. FIG. 10 is a diagram illustrating a cross-section of a side surface of the electronic device 101 according to various embodiments of the disclosure. FIG. 11 is a diagram illustrating the cross-section of the side surface of the electronic device 101 according to various embodiments of the disclosure. The cross-section illustrated in FIG. 10 may be a cross-section of the electronic device 101 illustrated in FIG. 9, taken along a C-C' direction.

Figure 10:
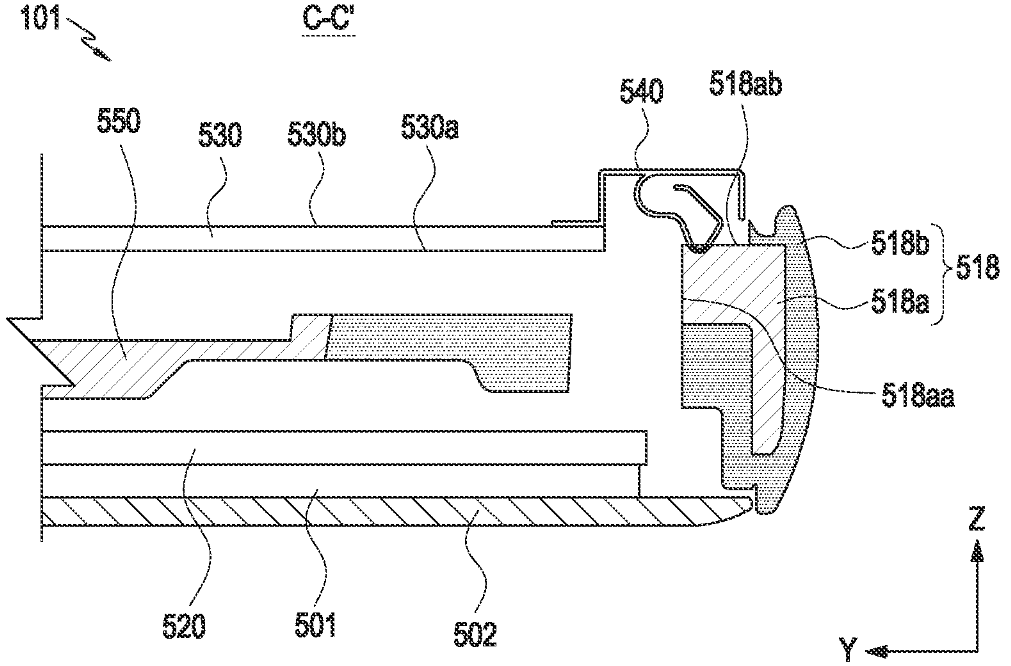
FIG. 10 is a diagram illustrating a cross-section of a side surface of an electronic device according to various embodiments of the disclosure.
Figure 11:
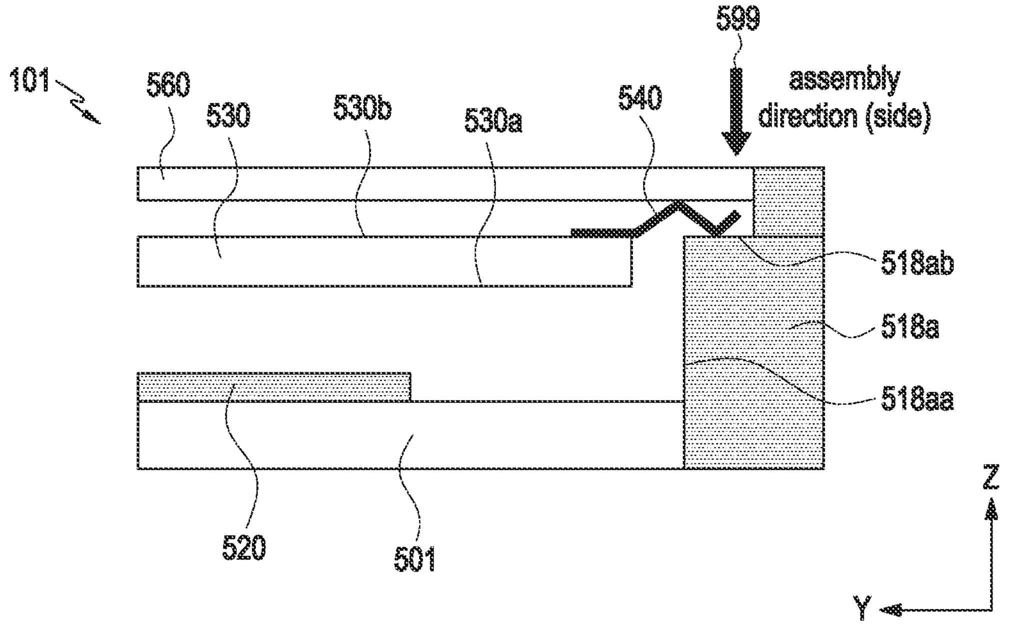
FIG. 11 is a diagram illustrating a cross-section of a side surface of an electronic device according to various embodiments of the disclosure.

Referring to FIGS. 9, 10 and 11, the electronic device 101 according to various embodiments of the disclosure may include a display 501 (e.g., the display 201 of FIGS. 2A and 2B), a front plate 502 (e.g., the front plate 202 of FIGS. 2 and 2B), a side bezel structure 518 (e.g., the side bezel structure 218 of FIGS. 2A and 2B) (referred to as a "side surface" 518) surrounding the inner space of a housing, PCBs 520 and 530, and a coupling member 540. The electronic device 101 may not be provided with at least one of the components or may additionally include other components in an embodiment. For example, the electronic device 101 may further include a rear plate (e.g., the rear plate 211 of FIG. 2B) and/or a support member 550 (e.g., a bracket), which is disposed in the inner space of the housing and coupled to the side bezel structure 518 or which is formed integrally with the side bezel structure 518.

Similar to the first comparative example and the second comparative example described with reference to FIGS. 3 to 8, the side bezel structure 518 also requires feeding and/or grounding to use a conductive portion 518*a* of the side bezel structure 518 as an antenna, and the coupling member 540 may be used for the feeding and/or grounding in the embodiment illustrated in FIGS. 9, 10 and 11. For example, the coupling member 540 may be disposed on a second surface 530*b* of the second PCB 430, and electronic components disposed on the second PCB 530 may be electrically coupled to the side bezel structure 518 through the coupling member 540.

According to the embodiment illustrated in FIGS. 9, 10 and 11, when the coupling member 540 is coupled to the side bezel structure 518, a flange as a component to increase contact stability may not be provided in the electronic device 101. Due to the absence of a flange protruding and extending from the side bezel structure 518 into the inner space of the housing, the conductive portion 518*e* of the side bezel structure 518 may not overlap with an electronic component (e.g., the display) or may overlap with the electronic component (e.g., the display) only over a partial small area. According to an embodiment, when viewed from above the display (projected in the Z-axis direction), the conductive portion 518*a* may be disposed in the vicinity of the display 501 without overlapping with the display 501.

According to various embodiments of the disclosure, the coupling member 540 may be formed to contact the conductive portion 518*a* of the side bezel structure 518 in the second direction. Referring to FIGS. 10 and 11, the conductive portion 518*a* may include a first inner side surface 518*aa* exposed in a third direction (e.g., the Y-axis direction) different from a first direction (e.g., a direction opposite to the Z axis) and the second direction (e.g., a direction parallel to the Z axis), and a second inner side surface 518*ab* exposed in the second direction. The coupling member 540 may be formed to contact the second inner side surface 518*ab* instead of the first inner side surface 518*aa*. According to various embodiments of the disclosure, the thickness of the conductive portion 518*a* in the width direction (e.g., the Y-axis direction) of the electronic device may be minimized as much as possible to remove or minimize an overlapped area with an electronic component (e.g., the display 501), and thus prevent or reduce antenna performance degradation. Accordingly, the electronic device according to the embodiment illustrated in FIGS. 9, 10 and 11 may be advantageous over the first comparative example and the second comparative example in terms of antenna performance.

Further, according to various embodiments of the disclosure, the coupling member 540 may be coupled to the conductive portion 518*a* in a vertical stacking method along the height direction (e.g., the Z-axis direction) of the electronic device, not in the side contact method. Referring to FIG. 11, an arrow 599 indicates an assembly direction of the coupling member 540 during assembly of the electronic device. In the vertical stacking method as a method of assembling an electronic device, assembly is easier than in the side contact method, and the coupling member 540 contacts the second inner side surface 518*ab* of the conductive portion 518*a*, exposed in the second direction during assembly, thereby increasing contact stability.

According to various embodiments, a support member 560 for supporting the coupling member 540 may further be included. The support member 560 may press and support the coupling member 540 to further increase the contact stability between the coupling member 540 and the conductive portion 518*a* of the side bezel structure 518. While a rear cover of the electronic device is shown as an example of the support member 560 in FIG. 11, the member 560 is not limited to the rear cover. For example, the support member 560 may be a bracket of a rigid material disposed in the inner space of the electronic device, or may be formed of an elastic material such as poron or rubber. There may be various other examples of the support member 560.

Referring back to FIG. 9, in another embodiment of stably fixing the coupling member 540 to the second PCB 530, a recess 530*d* may be formed on one surface 530*b* of the PCB 530 to accommodate the coupling member 540 therein. According to an embodiment, the coupling member 540 may be fit in the recess 530*d* of the second PCB 530, not to be separated from the second PCB 530.

Figure 12:
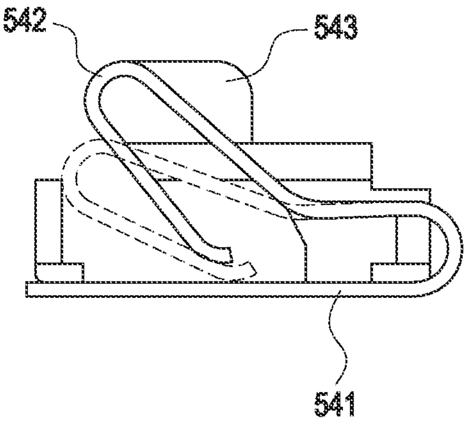
FIG. 12 is a cross-sectional view illustrating a coupling member according to various embodiments of the disclosure.
Figure 13:
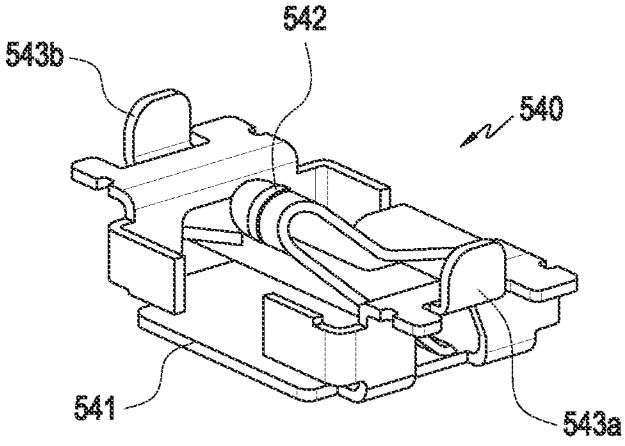
FIG. 13 is a diagram illustrating a coupling member according to various embodiments of the disclosure.
Figure 14:
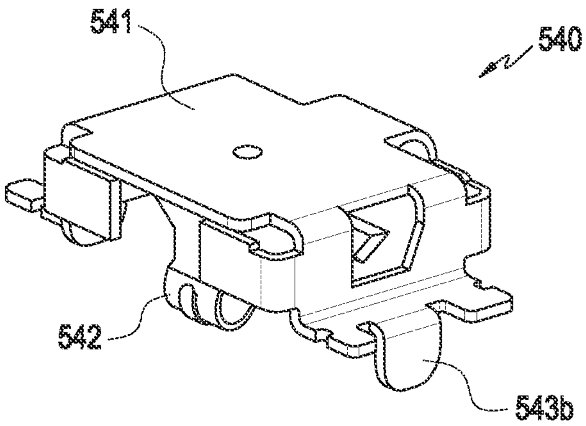
FIG. 14 is a diagram illustrating a coupling member according to various embodiments of the disclosure.
Figure 15:
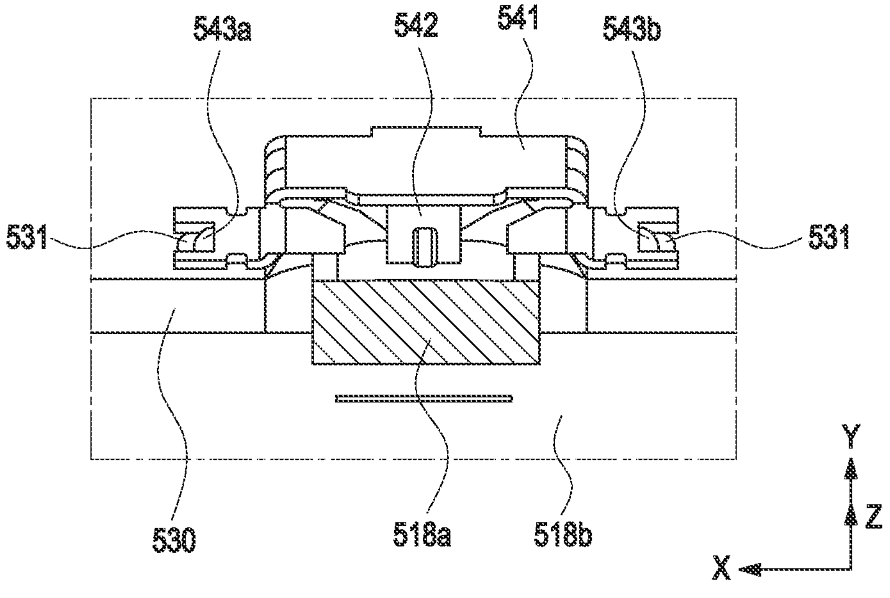
FIG. 15 is a cross-sectional view illustrating a coupling member contacting a conductive portion on a side surface according to various embodiments of the disclosure.

FIG. 12 is a cross-sectional view illustrating the coupling member 540 (e.g., C-clip) according to various embodiments of the disclosure. FIG. 13 is a diagram illustrating the coupling member 540 (e.g., C-clip) according to various embodiments of the disclosure. FIG. 14 is a diagram illustrating the coupling member 540 (e.g., C-clip) according to various embodiments of the disclosure. FIG. 15 is a diagram illustrating a cross-section of the coupling member 540 (e.g., C-clip) when the coupling member 540 contacts the conductive portion 518*a* on the side surface according to various embodiments of the disclosure.

According to various embodiments, the coupling member 540 for contacting the conductive portion 518*a* may be formed of a conductive material. For example, the coupling member 540 may correspond to a C-clip as a conductive material. According to an embodiment, the coupling member 540 may include a base plate 541 and an elastic contact portion 542 extending from one surface of the base plate 541. The elastic contact portion 542 may be configured to be elastically pressed in contact with the conductive portion 518*a* and maintain the contact with the conductive portion 518*a* using an elastic repulsion force, during assembly of the electronic device.

According to various embodiments, the coupling member 540 may include a fixing portion 543 to fix the coupling member 540 to a PCB (e.g., the second PCB 530). Referring to FIGS. 13 and 14, the fixing portion 543 may include a pair of fixing portions 543*a* and 543*b* symmetrically formed on both sides of the elastic contact portion 542. Referring to FIG. 15, as the fixing portion 543 is formed in a hook structure insertable into and caught in an opening 531 formed on the PCB (e.g., the second PCB 530), the coupling member 540 may be stably fixed to the PCB (e.g., the second PCB 530).

According to various embodiments, the support member 560 may be stacked on the other surface of the base plate 541 to support the coupling member 540. Referring to FIG. 11 together with FIG. 15, the elastic contact portion 542 extending from one surface of the base plate 541 of the coupling member 540 may contact the second inner side surface 518*ab* of the conductive portion 518*a*, facing the second direction (e.g., a direction parallel to the Z axis), and the support member 560 for supporting the coupling member 540 may be stacked on the other surface of the base plate 541. The support member 560 may press and support the coupling member 540 to further increase the contact stability between the elastic contact portion 542 and the conductive portion 518*a*.

A description will be given of a coupling member 640 according to another embodiment illustrated in FIGS. 16 to 19, different from the embodiment of FIGS. 10 to 15.

Figure 16:
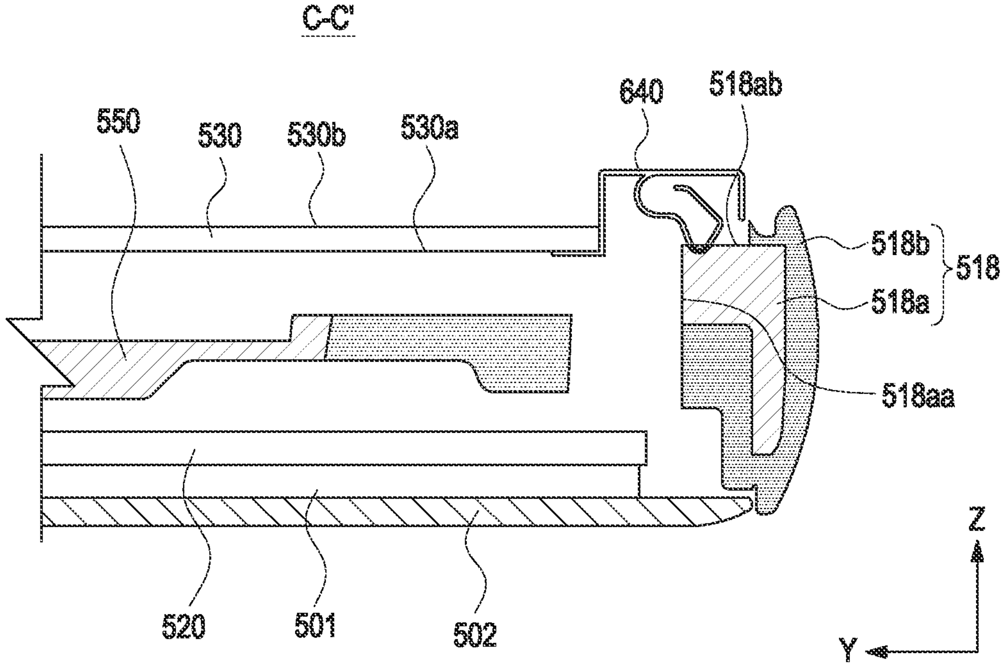
FIG. 16 is a diagram illustrating a cross-section of part of an electronic device according to various embodiments of the disclosure.
Figure 17:
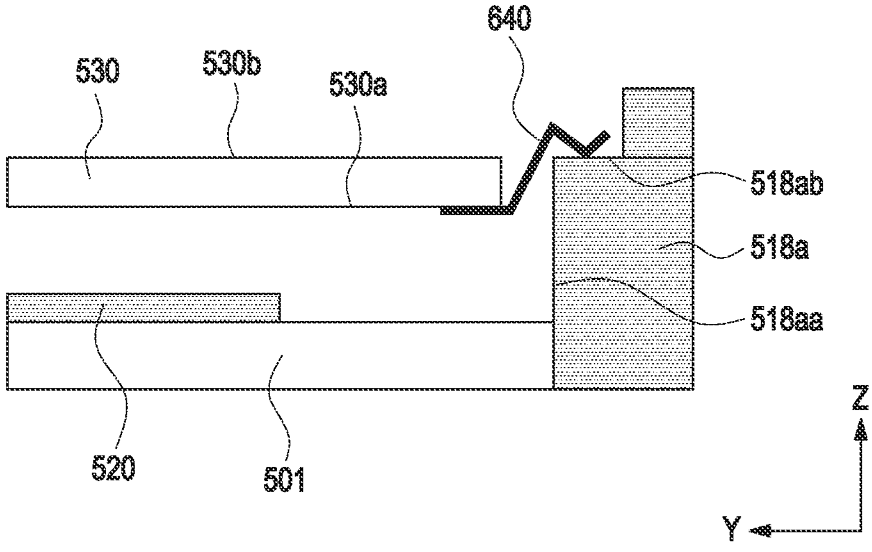
FIG. 17 is a diagram illustrating a cross-section of part of an electronic device according to various embodiments of the disclosure.

FIG. 16 is a diagram illustrating a cross-section of a side of an electronic device according to various embodiments of the disclosure. FIG. 17 is a diagram illustrating the cross-section of the side of the electronic device according to various embodiments of the disclosure. The cross-section illustrated in FIGS. 16 and 17 may be cross-sections of the electronic device illustrated in FIG. 9, taken along the C-C' direction.

According to various embodiments of the disclosure, the coupling member 640 may be formed to contact the conductive portion 518*a* of the side bezel structure 518 in the second direction. According to the embodiments of FIGS. 16 and 17, the coupling member 640 may be formed to have one end disposed on the first surface 330*a* of the second PCB 530 and the other end contacting the second inner side surface 518*ab* of the conductive portion 518*a* of the side bezel structure 518. In the embodiments of FIGS. 16 and 17, the coupling member 640 may also be coupled to the conductive portion 518*a* in the vertical stacking method along the height direction (e.g., the Z-axis direction) of the electronic device, not in the side contact method. In the vertical stacking method as a method of assembling an electronic device, assembly is easier than in the side contact method, and the coupling member 640 contacts the second inner side surface 518*ab* of the conductive portion 518*a*, exposed in the second direction during assembly, thereby increasing contact stability.

Figure 18:
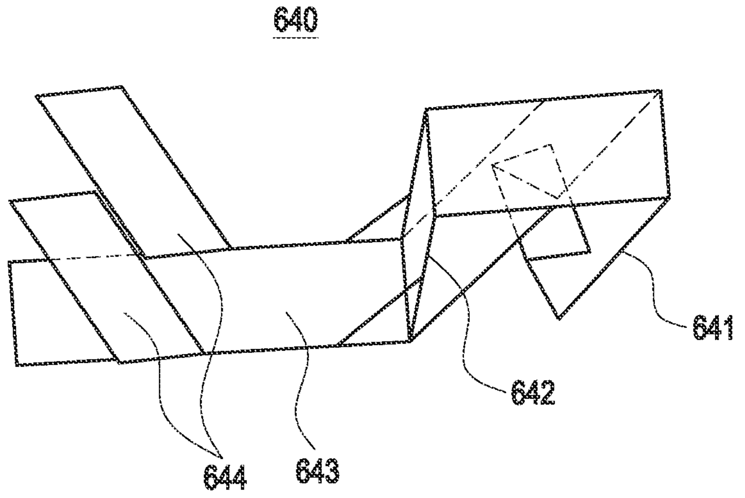
FIG. 18 is a diagram illustrating a coupling member according to various embodiments of the disclosure.
Figure 19:
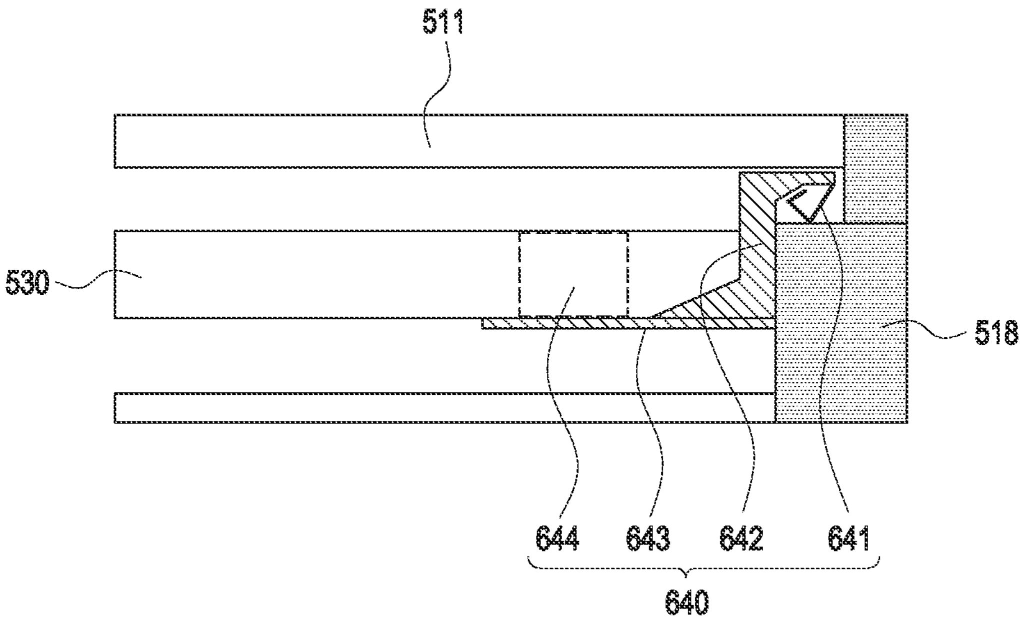
FIG. 19 is a cross-sectional view illustrating a coupling member contacting a conductive portion on a side surface according to various embodiments of the disclosure.

FIG. 18 is a diagram illustrating the coupling member 640 (e.g., C-clip) according to various embodiments of the disclosure. FIG. 19 is a diagram illustrating a cross-section of the coupling member 640 (e.g., C-clip), when the coupling member 640 contacts the conductive portion 518*a* on the side surface according to various embodiments of the disclosure.

According to various embodiments, the coupling member 640 for contacting the conductive portion 518*a* may be formed of a conductive material. The coupling member 640 may correspond to a C-clip as an example of the conductive material. According to an embodiment, the coupling member 640 may include a base plate 643, a mast 642 protruding from one surface of the base plate 643, and a contact portion 641 extending in one direction from the mast 642. According to an embodiment, the contact portion 641 may be formed in the shape of a hook and configured to be elastically pressed in contact with the conductive portion 518*a* during assembly of the electronic device, and maintain the contact with the conductive portion 518*a* using an elastic repulsion force.

According to various embodiments, the coupling member 640 may include a fixing portion 644 for fixing the coupling member 640 to a PCB (e.g., the second PCB 530). Referring to FIGS. 18 and 19 together, the fixing portion 644 may include a pair of fixing portions. Referring to FIG. 19, the fixing portion 644 may be formed in a structure which may be inserted and fixed in an opening formed on a PCB (e.g., the second PCB 530), and may stably fix the coupling member 640 to the PCB (e.g., the second PCB 530).

The support member 560 for supporting the coupling member 640 may be stacked on the coupling member 640, as illustrated in FIGS. 16 to 19, which should not be construed as limiting. According to the embodiment illustrated in FIGS. 16 to 19, since the coupling member 640 is disposed on the first surface 530*a* of the PCB (e.g., the second PCB 530), the PCB (e.g., the second PCB 530) itself may serve to prevent separation of the coupling member 640 and increase contact stability, unlike the coupling member 540 described before with reference FIGS. 10 to 15.

According to the above-described embodiments, the electronic device including a metal antenna according to the disclosure may not be provided with an existing flange protruding into the inner space of the housing, for feeding or grounding in a metal frame (e.g., a conductive portion of a side bezel structure). Therefore, the electronic device may be advantageous in that the degradation of antenna performance is prevented or reduced by minimizing overlap between the flange and an electronic component in the height direction (e.g., the second direction) of the electronic device.

Further, because the metal frame and a coupling member are assembled in the height direction (e.g., the second direction) of the electronic device, assembly may be easy, and the shortcomings of the existing side contact method for the metal frame may be overcome.

In addition, the coupling member may have one side in contact with the metal frame and the other side pressed and supported by another member, thereby having a stable contact structure.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B”, “at least one of A and B”, “at least one of A or B”, “A, B, or C”, “at least one of A, B, and C”, and “at least one of A, B, or C” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with”, “coupled to”, “connected with”, or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, an electronic device (e.g., the electronic device 101 of FIGS. 1, 2, 3 and 6) may include a housing (e.g., the housing 210 of FIGS. 2A and 2B) including a front surface (e.g., the front surface 210A of FIG. 2A) facing a first direction (e.g., a direction opposite to the Z axis in FIG. 10), a rear surface (e.g., the rear surface 210B of FIG. 2B) facing a second direction (e.g., the Z-axis direction of FIG. 10) opposite to the first direction, and a side surface (e.g., the side surfaces 210C of FIG. 2B) surrounding an inner space between the front surface and the rear surface, where at least part of the side surface is formed to be a conductive portion, a display (e.g., the display 501 of FIG. 10) disposed on the front surface of the housing, a PCB (e.g., the second PCB 530 of FIG. 10) disposed in the inner space inside the housing; and a coupling member (e.g., the coupling member 540 of FIG. 10) coupled to the conductive portion of the side surface, while being disposed on the PCB. The coupling member may be configured to contact the conductive portion (e.g., the conductive portion 518*a* of FIG. 10) of the side surface in the second direction.

According to various embodiments, the conductive portion of the side surface may include a first inner side surface (e.g., the first inner side surface 518*aa* of FIG. 10) exposed in a third direction different from the first direction and the second direction in the inner space, and a second inner side surface (e.g., the second inner side surface 518*ab* of FIG. 10)

exposed in the second direction. The coupling member may be configured to contact the second inner side surface.

According to various embodiments, the PCB may include a first surface (e.g., the first surface 530*a* of FIG. 10) facing a direction parallel to the first direction, and a second surface (e.g., the second surface 530*b* of FIG. 10) facing a direction parallel to the second direction, and the coupling member may be configured to contact the second inner side surface, while being disposed on the second surface of the PCB.

According to various embodiments, the PCB may include a first surface facing a direction parallel to the first direction, and a second surface facing a direction parallel to the second direction, and the coupling member may be configured to contact the second inner side surface of, while being disposed on the first surface of the PCB.

According to various embodiments, at least part of the conductive portion of the side surface may be formed to be surrounded by a non-conductive portion (e.g., the non-conductive portion 518*b* of FIG. 10).

According to various embodiments, the coupling member may be formed of a conductive material.

According to various embodiments, the coupling member may be a C-clip

According to various embodiments, the coupling member may include a base plate and an elastic contact portion extending from one surface of the base plate. The coupling member may further include a fixing portion to fix the coupling member to the PCB.

According to various embodiments, a member (e.g., the support member 560 of FIG. 11) for supporting the coupling member may be stacked on the other surface of the base plate.

According to various embodiments, the member may be a rear cover of the electronic device or a bracket disposed in the inner space.

According to various embodiments, the member may be formed of poron or rubber.

According to various embodiments, the conductive portion of the side surface may be formed to operate as an antenna radiator.

According to various embodiments of the disclosure, an electronic device may include a housing including a front surface facing a first direction, a rear surface facing a second direction opposite to the first direction, and a side surface surrounding an inner space between the front surface and the rear surface, where at least part of the side surface is formed to be a conductive portion; a display disposed on the front surface, a first PCB disposed in the inner space inside the housing, a second PCB disposed inside the housing and spaced apart from the first PCB by a specific distance in the second direction, and a coupling member disposed on one surface of the second PCB, and coupled to the conductive portion of the side surface. The conductive portion of the side surface may include a first inner side surface exposed in a third direction different from the first direction and the second direction in the inner space, and a second inner side surface exposed in the second direction. The coupling member may be configured to contact the second inner side surface of the conductive portion of the side surface.

According to various embodiments of the disclosure, an electronic device may include a housing including a front surface facing a first direction, a rear surface facing a second direction opposite to the first direction, and a side surface surrounding an inner space between the front surface and the rear surface, where at least part of the side surface includes a conductive portion, a display provided on the front surface, a first PCB provided in the inner space, a second PCB provided inside the housing and spaced apart from the first PCB by a predetermined distance in the second direction, and a coupling member provided on one surface of the second PCB, and coupled to the conductive portion of the side surface, where the conductive portion of the side surface includes a first inner side surface exposed in a third direction different from the first direction and the second direction in the inner space and a second inner side surface exposed in the second direction, and the coupling member contacts the second inner side surface of the conductive portion of the side surface.

It will be apparent to those skilled in the art that the above-described electronic device according to various embodiments of the disclosure is not limited by the foregoing embodiments and the drawings, and many replacements, changes, and modifications can be made within the technical scope of the disclosure.

What is claimed is:

1. An electronic device comprising:
- a housing comprising:
  - a front surface facing a first direction,
  - a rear surface facing a second direction opposite to the first direction, and
  - a side surface surrounding an inner space between the front surface and the rear surface, wherein at least part of the side surface comprises a conductive portion;
- a display provided on the front surface of the housing;
- a printed circuit board (PCB) provided in the inner space; and
- a coupling member provided on the PCB and coupled to the conductive portion of the side surface,
- wherein the coupling member contacts the conductive portion of the side surface facing the second direction,
- wherein, when viewed from above the display, the conductive portion is disposed without overlapping with the display,
- wherein the conductive portion of the side surface comprises a first inner side surface exposed in a third direction different from the first direction and the second direction in the inner space, and a second inner side surface exposed in the second direction, and
- wherein the coupling member contacts the second inner side surface.

2. The electronic device of claim 1, wherein the PCB comprises a first surface facing a fourth direction parallel to the first direction, and a second surface facing a fifth direction parallel to the second direction, and
- wherein the coupling member is provided on the second surface of the PCB and contacts the second inner side surface.

3. The electronic device of claim 1, wherein the PCB comprises a first surface facing a sixth direction parallel to the first direction, and a second surface facing a seventh direction parallel to the second direction, and
- wherein the coupling member is provided on the first surface of the PCB and contacts the second inner side surface.

4. The electronic device of claim 1, wherein at least part of the conductive portion of the side surface is surrounded by a non-conductive portion.

5. The electronic device of claim 1, wherein the coupling member comprises a conductive material.

6. The electronic device of claim 5, wherein the coupling member comprises a C-clip.

7. The electronic device of claim 6, wherein the coupling member comprises:

a base plate, an elastic contact portion extending from a first surface of the base plate, and a fixing portion fixing the coupling member to the PCB.

8. The electronic device of claim 7, further comprising a member supporting the coupling member and provided on a second surface of the base plate.

9. The electronic device of claim 8, wherein the member supporting the coupling member comprises a rear cover of the electronic device or a bracket provided in the inner space.

10. The electronic device of claim 8, wherein the member comprises poron or rubber.

11. The electronic device of claim 1, wherein the conductive portion of the side surface is configured to operate as an antenna radiator.

* * * * *